March 24, 1936.  W. J. BRETH ET AL  2,035,422
TIRE BUILDING MACHINE
Original Filed Sept. 4, 1931  5 Sheets-Sheet 1

March 24, 1936.  W. J. BRETH ET AL  2,035,422
TIRE BUILDING MACHINE
Original Filed Sept. 4, 1931   5 Sheets-Sheet 2

INVENTOR
Walter J. Breth
and
Max L. Engler
BY
Evans & McCoy
Their ATTORNEYS

March 24, 1936.  W. J. BRETH ET AL  2,035,422
TIRE BUILDING MACHINE
Original Filed Sept. 4, 1931   5 Sheets-Sheet 4
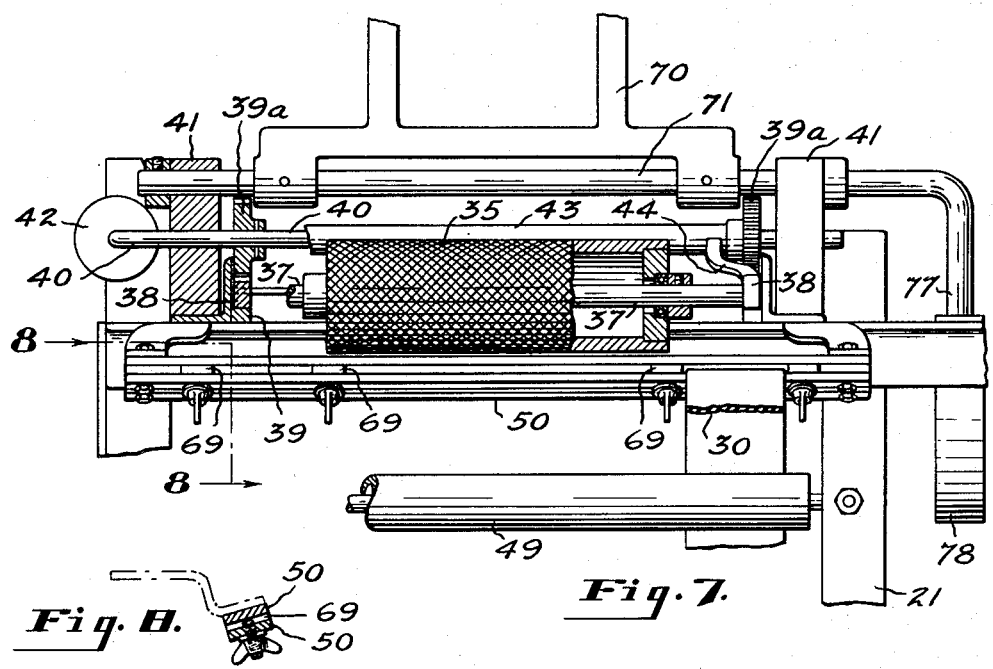
Fig. 7.
Fig. 8.
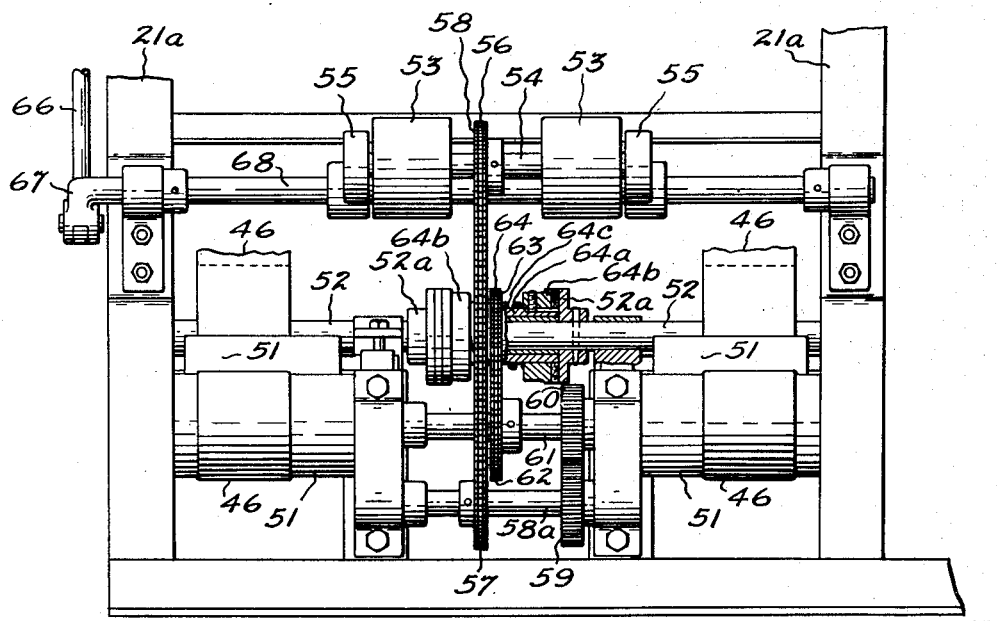
Fig. 9.
INVENTOR
Walter J. Breth
and
Max L. Engler
BY
Evans & McCoy
Their ATTORNEYS

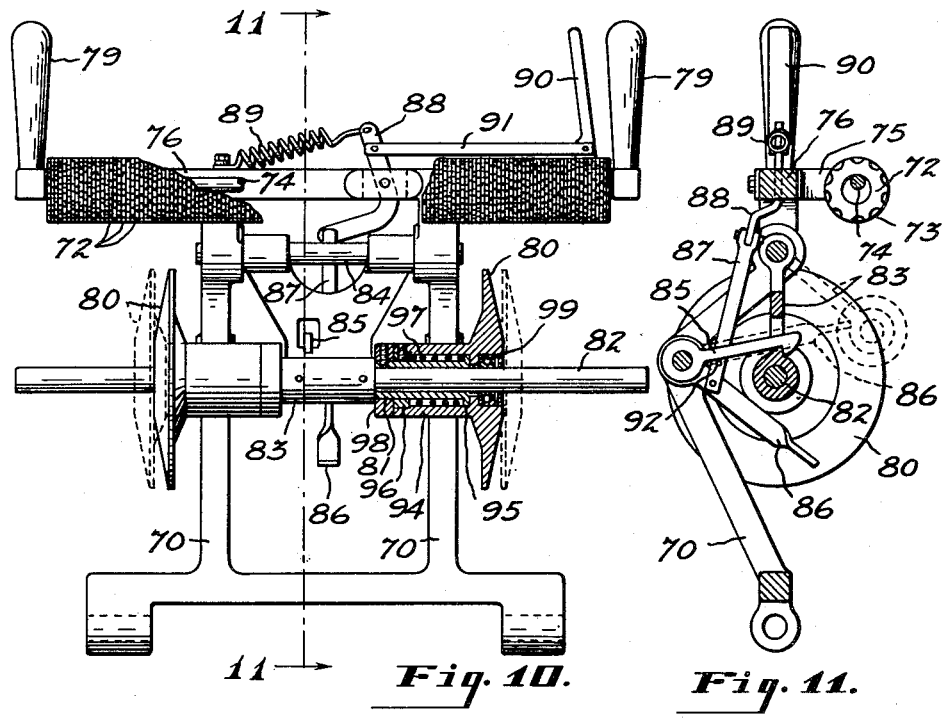
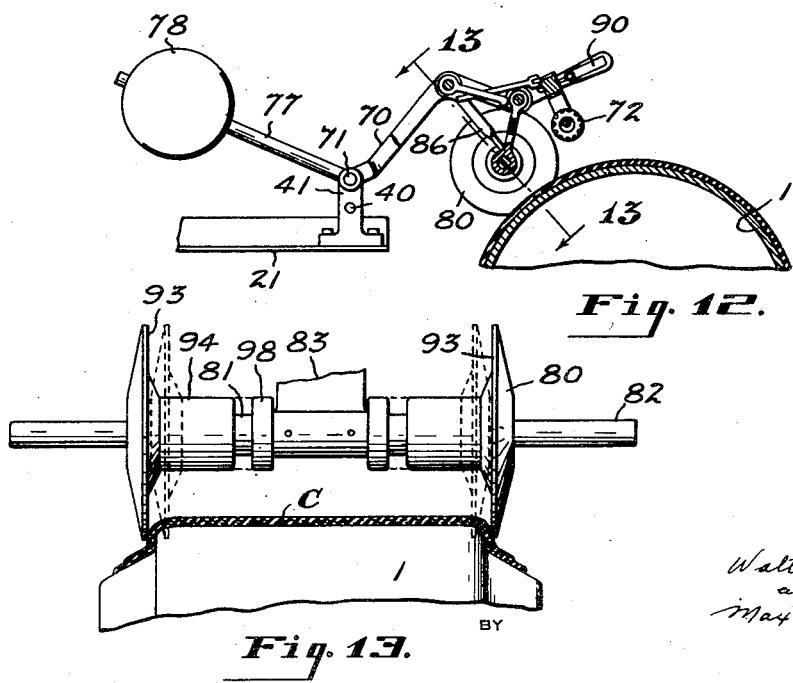

Patented Mar. 24, 1936

2,035,422

UNITED STATES PATENT OFFICE 2,035,422

TIRE BUILDING MACHINE

Walter James Breth and Max Leo Engler, Akron, Ohio, assignors to The General Tire & Rubber Company, Akron, Ohio, a corporation of Ohio Original application September 4, 1931, Serial No. 561,096. Divided and this application March 29, 1933, Serial No. 663,335

6 Claims. (Cl. 154—10)

This invention relates to tire building machines, and more particularly to machines of the drum type.

One of the objects of the present invention is to provide a tire building machine of such new and improved construction that tire casings can be built thereon more economically and in a shorter time than has been heretofore possible.

Another object is to provide a tire building machine wherein the elements used in building up the tire carcass may be easily and accurately fed to the tire building drum with a minimum of manual labor.

Another object is to provide an improved tire building machine having stitching means thereon of improved construction arranged to efficiently and quickly perform the stitching operation on the fabric plies and squeegee stock that is positioned on the fabric plies.

A further object is to provide a tire building machine with improved means for stitching the side portions of the tire carcass being built up on the assembly drum.

With the above and other objects in view which will be apparent from the detailed following description, the present invention consists in certain features of construction and combinations of parts which will be readily understood by those skilled in the art to which the invention appertains.

In the drawings which illustrate a suitable embodiment of the tire building machine of the present invention, Figure 1 is a plan view of the complete tire building machine;

Fig. 7 is an enlarged fragmentary view of the forward end of the machine taken substantially as looking in the direction of the arrows 7—7 shown in Fig. 2;

Fig. 8 is an enlarged section taken substantially on the line 8—8 of Fig. 7;

Fig. 9 is a forward end elevation of the forward lower portion of the tire building machine taken in the direction of the arrows 9—9 of Fig. 2;

Fig. 10 is an enlarged view of the stitching apparatus for the tire building machine, portions of the same being broken away and shown in section;

Fig. 11 is a section taken substantially on the line 11—11 of Fig. 10;

Fig. 12 is a fragmentary section through the stitching apparatus and tire building drum showing the side stitchers in operative position;

Fig. 13 is an enlarged section taken approximately on the line 13—13 of Fig. 12.

Figure 1:
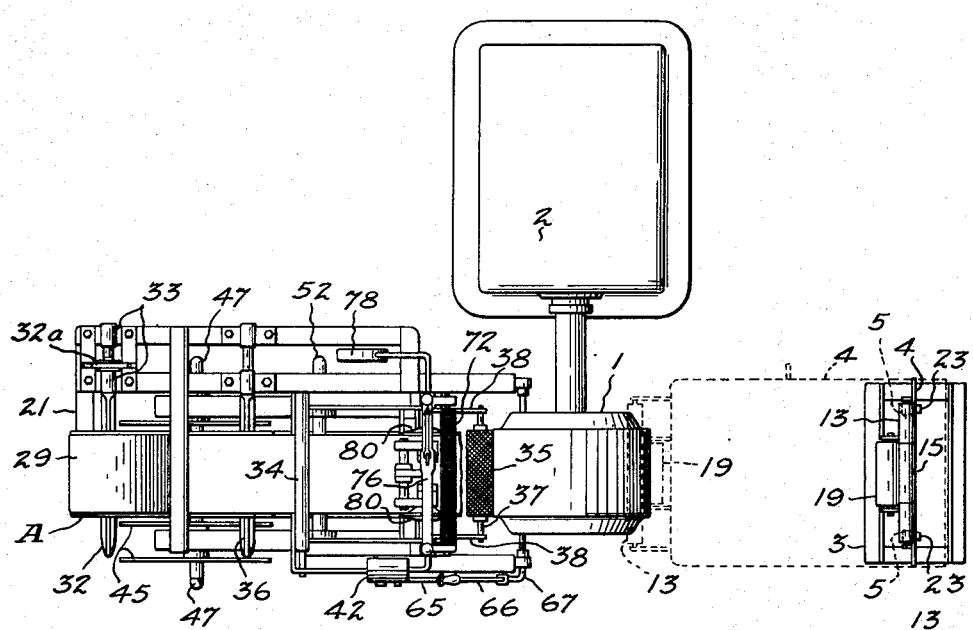

Referring to the accompanying drawings in which like numerals refer to like parts throughout the several views, the rotatable drum 1 on which the tire carcass is constructed may be of any suitable type and is mounted for rotation in either direction on a suitable standard 2.

A suitable frame 3 positioned forwardly of and in spaced relation to the drum 1 supports the feeding means for the fabric plies that go to make up the body of the tire carcass. The ply feeding apparatus is more clearly described in our co-pending application Serial No. 561,096, filed September 4, 1931, of which this application is a division, and comprises in general a flat table 4 having a pair of brackets 5 secured to the under side thereof near one end. These brackets 5 carry a support rod 6 which extends therethrough and through the side pieces of the supporting frame 3. A balancing weight 12 is secured to the under side of the table at its forward end, which tends to maintain the table in its vertical position. The ply feeding apparatus, when in use, is pivoted to the horizontal position shown in dotted outline in Fig. 2. Transversely extending rollers 13 and 14 are secured to opposite ends of the ply feeding device, over which an endless apron 15 is arranged to operate. The endless apron 15 is so arranged that its upper side lies flat on the table 4, and its lower side passes over the support rod 6 and around the rollers 13 and 14.

The apron 15 is operated by the tire building drum 1 through the medium of a driving roll 19 which is secured to the table 4 by suitable brackets 20. The driving roll 19 is mounted forwardly of the rearmost roller 13 to contact with the lower side of the apron 15, and is arranged to create tension in the apron. In order to provide slipless driving contact between the driving roll 19 and the apron, and the driving roll and the drum 1 or the tire carcass partially assembled thereon, the roll 19 is preferably formed with a surface covering of rubber or some suitable material that will propel the apron 15 without slippage.

Figure 2:
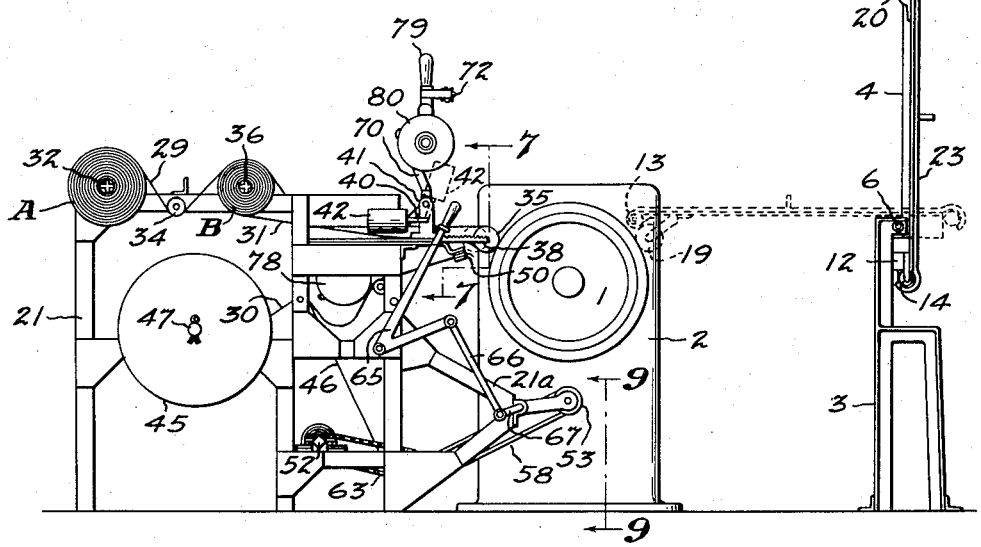
Fig. 2 is a side elevation of the machine shown in Fig. 1.
Figure 4:
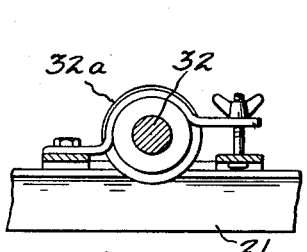
Fig. 4 is an enlarged section taken substantially on the line 4—4 of Fig. 3.

In operation, the operator pivots the table 4 to its horizontal position, as shown in dotted outline in Figs. 1 and 2, so that the drive roll 19 will bear against the drum 1 or the tire carcass partially formed thereon. The operator then causes the drum to rotate in a counter-clockwise direction, as viewed in Fig. 1, which causes the upper side of the feed apron 15 to travel toward the drum 1, and he then places the fabric plies to be applied on the apron 15 which moves the same toward the drum 1, the peripheral rate of the drum being substantially the same as the rate of travel of the apron 15. The fabric ply being fed to the drum is guided into a centered position on the apron 15 by means of adjustable side guides 23 carried by the table 4.

It is very essential in building tire carcasses that the fabric plies be properly centered when they are applied to the tire carcass. This is assured in the device described because the center lines of the ply feed apron 15 and drum 1 are arranged coincident with each other, the side guides 23 being equally spaced from the center line of the apron 15.

In the construction of tire carcasses, it is frequently the practice to position squeegee strips of suitable rubber stock between the plies of fabric, and it is one of the purposes of the present invention to provide suitable and convenient means for feeding the squeegee stock to the building drum 1.

In the present invention a suitable framework 21 is stationed adjacent the rear side of the tire building drum 1, and on this framework the rolls of the squeegee stock 29 and rolls of the empty chafer strip 30, together with the attendant feeding mechanism are mounted.

The rubber squeegee stock 29 is wound up in rolls A with a separator or liner 31 interposed between each layer to prevent the individual layers from sticking together.

Figure 6:
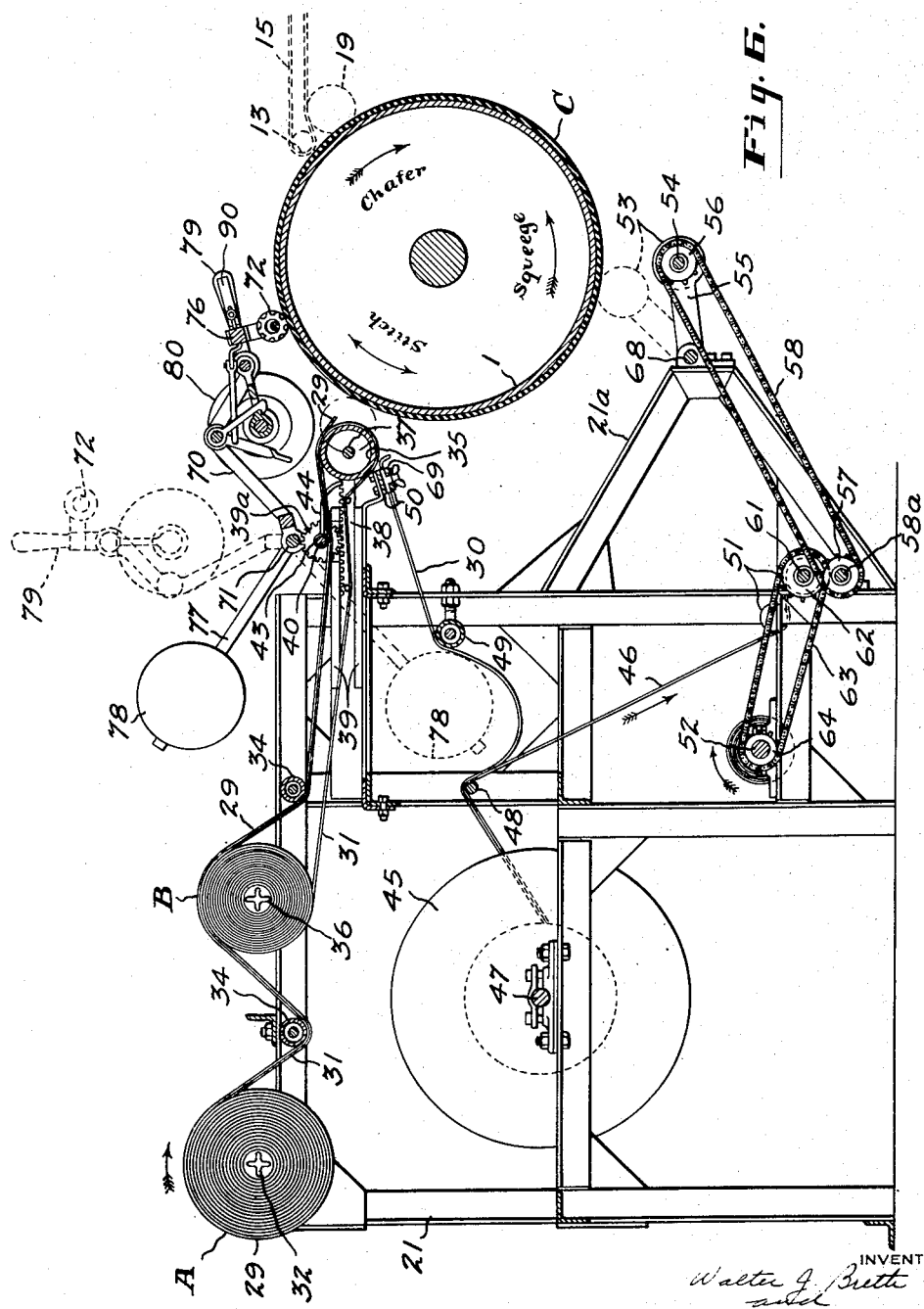
Fig. 6 is an enlarged side elevation of the tire building machine, portions of the same being broken away and shown in section to more clearly illustrate the cooperative parts of the machine.

The roll A of the squeegee stock, as shown in Fig. 6, is mounted on a rotatable mandrel 32 supported by the upper side of the supporting framework 21. The mandrel is cross-shaped in cross-section, and one end is circular and rotatably mounted in spaced bearings 33. The squeegee stock 29 and liner 31 pass underneath spaced guide rollers 34 and over a relatively large drive cylinder 35 which is movable toward and away from the tire building drum, and the empty liner 31 is led back toward the supply roll A and is wound around a suitable mandrel 36 interposed between the spaced guide rollers 34 in such a manner as will be later apparent, that the squeegee stock 29 and liner 31 moving toward the drum 1 passes over and is in engagement with the roll B of liner material 31 in order to cause the empty liner to be wound on the mandrel 36.

The movable feed cylinder 35 is formed with a knurled surface and is rotatably mounted and held against edgewise movement on a shaft 37 which is carried at the forward end of a pair of spaced guide bars 38. These guide bars are guided for longitudinal movement in spaced guide pieces 39 mounted on the framework 21 and are provided with rack surfaces which are in mesh engagement with suitable gears 39a that are rigidly mounted on a rotatable shaft 40. The shaft 40 is rotatably mounted in spaced upstanding brackets 41 secured to the supporting flange, and one end is provided with the counterweight 42 which is arranged to be swung upwardly and over toward the rear and away from the drive cylinder 35 in order to cause the gears 39a on the shaft 40, through the medium of the rack guide bars 38, to move the cylinder 35 toward the assembly drum until the empty liner 31 passing therearound abuts against the assembly drum 1, as shown in dotted outline in Fig. 6. When the drum 1 is rotated in a counter clockwise direction, it drives the cylinder 35 which, by reason of the empty liner 31 passing thereover, causes the stock to be unwound from the supply roll A and the empty liner 31 to be wound around the roll B.

The operator merely separates the squeegee stock 29 from the liner 31 adjacent the drum 1, and positions the same on the carcass being built on the drum, and then starts the drum to rotate in a counter clockwise direction, thus causing the squeegee stock to be fed to the drum in a very efficient manner in the proper centered position. It is obvious that the application of the squeegee stock in this manner to the tire carcass eliminates the slow and awkward application of the stock by hand.

Sufficient pressure is created between the drum 1 and cylinder 35 to cause positive driving of the roll by the weight 42 and inadvertent lessening of this pressure is prevented by a lock arrangement. This is provided for by a sleeve 43 freely mounted on the shaft 40 which is provided with forwardly extending pawls 44 that are arranged to engage with the rack teeth formed on the guide bars 38 and prevent inadvertent rearward movement of the cylinder 35.

When a sufficient quantity of the squeegee stock 29 is applied to the carcass being built on the roll 1, the operator merely stops the machine and tears off the stock to the required length, and then releases the pawls 44 and moves the weight 42 in a forward direction to cause the cylinder 35 to move rearwardly to the position shown in Fig. 6.

A slight drag is exerted on the mandrel shaft 32 by means of a strap 32a that engages the shaft 32 and acts as a brake to prevent too much freedom of rotation of the roll A of stock.

Figure 3:
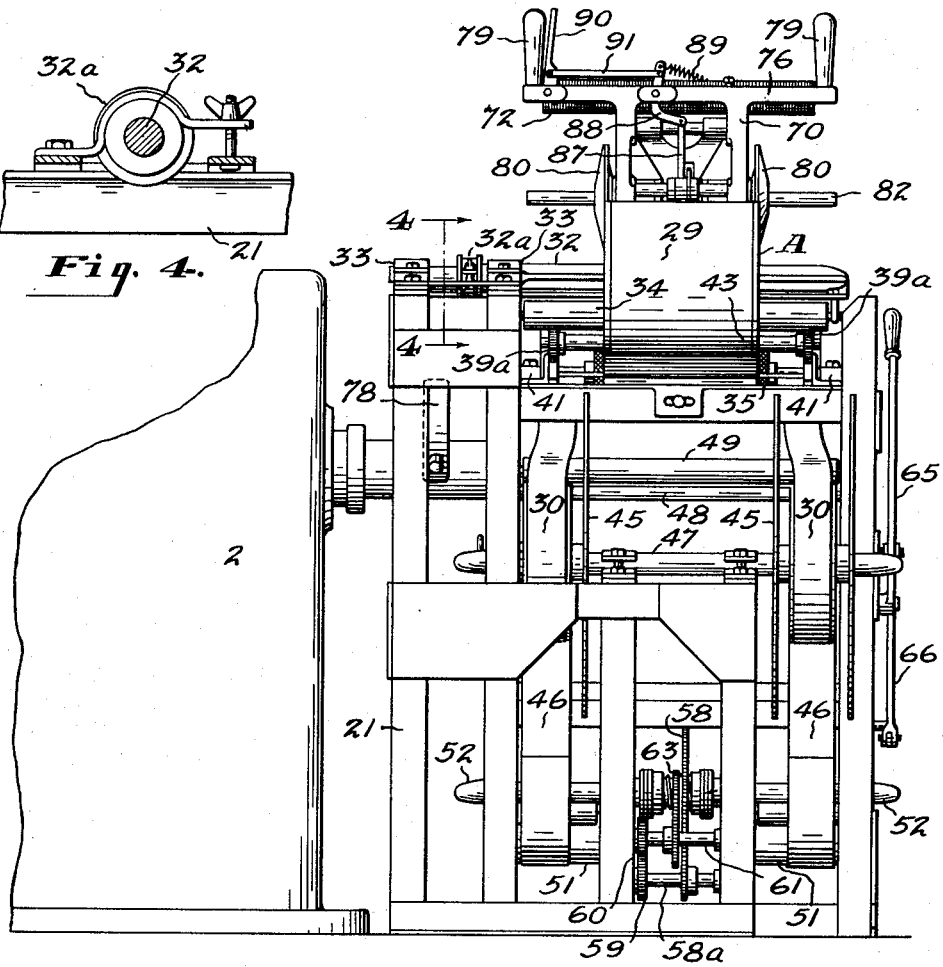
Fig. 3 is an enlarged rear end elevation of the machine illustrated in Fig. 1.
Figure 5:
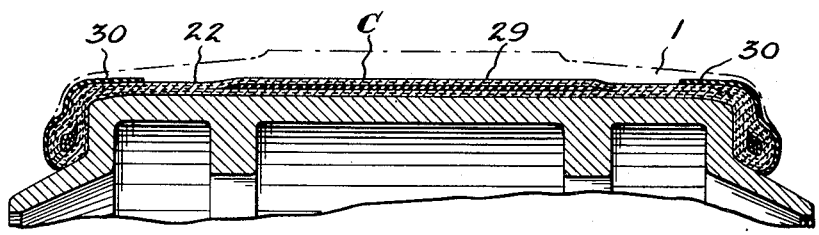
Fig. 5 is an enlarged section taken through the tire building drum showing a tire carcass in the process of assembly thereon.

Suitable means are also provided for feeding the chafer strips 30 to the tire building drum 1 in their proper centered position without the necessity of the operator having to apply these chafer strips by hand. As shown in Figs. 3, 6 and 9, the chafer strips are wound upon spaced supply drums 45 with a liner 46 interposed between each layer to prevent the chafer strips from sticking together. The supply drums are mounted in spaced relation on a suitable shaft 47 carried by the framework 21, and are so arranged that the chafer strips may be fed to the edges of the tire carcass being assembled on the drum in their proper position. The chafer strip 30 and liner 46 are led over a guide bar 48 mounted on the framework above the axis of the drum shaft 47, and the chafer strips are separated from the separators 46 substantially at this point and are then led over a suitable roller 49 and thence through a pair of spaced bars 50 positioned below the feed roll 35. The bars 50 are adjustable toward each other and are arranged to exert a slight friction on the chafer strips 30.

The liner 46 for the chafer strips passes downwardly and around a pair of rolls 51 and back to a suitable mandrel 52, where the same may be wound up during the application of the chafer strips to the tire carcass. The mandrel 52 is positively driven by the tire building drum 1. This is accomplished by drive rolls 53 that may be moved into and out of engagement with the tire building drum or the carcass being assembled thereon. The drive rolls 53 are mounted upon a shaft 54 carried by suitable arms 55 that are pivoted to a forward extension 21a of the supporting framework. The shaft 54 for the drive rolls 53 is provided, as shown in Figs. 6 and 9, with a sprocket 56 that drives a sprocket 57 through the medium of a suitable link chain 58. The sprocket 57 is mounted on a shaft 58a that carries a gear 59 which meshes with a gear 60 mounted on the shaft 61 that supports one of the rolls 51 over which the liner 46 passes. The shaft 61 is also provided with a sprocket 62 and through the medium of a link chain 63 drives a corresponding sprocket 64 mounted on a sleeve 64a rotatably carried by the mandrel 52. The sleeve 64a is provided with a collar 64b having frictional material on its surface that is resiliently engageable with a collar 52a rigidly secured to the mandrel 52. The collar 64b is slidable on the sleeve 64a and is yieldingly held against the collar 52a by means of a compression spring 64c in order to permit a slipping driving connection between the collars 52a and 64b to compensate for the increased linear speed of the liner 46 as it is wound on the mandrel 52.

It is thus obvious that when the building drum 1 is rotated in a clockwise direction the mechanism just described will cause the mandrel 52 to rotate in a clockwise direction and roll up the liner 46 which incidentally causes the liner and chafer strip to unwind from the supply drum 45.

A bell crank lever 65 is mounted on the framework 21 and is provided with a link 66 which connects with a crank arm 67 formed on the shaft 68 which rigidly supports the arms 55. By moving the lever 65 the drive rolls 53 may be moved into and out of engagement with the tire building drum.

In operation, the operator moves the drive roll 53 into engagement with the drum 1 which is rotating in a clockwise direction, and this causes the chafer strips to be unwound from the supply drum 45. The operator then merely pulls the chafer strips 30 between the space bars 50 and applies the same to the carcass being assembled on the drum 1. The rotation of the drum 1 causes the chafer strips 30 to position themselves in their proper position on the tire carcass, and when a sufficient length of the chafer strips 30 has been applied to the carcass the operator severs the strips forwardly of the space bars 50 and relases the feed roll 53 from engagement with the tire building drum by actuating the lever 65. It is thus seen that the chafer strips may be supplied in roll form, and that they can be very easily applied to the tire carcass being assembled without the necessity of the operator having to turn around and select chafer strips of predetermined length from the rack which is customarily positioned near the tire building drum.

The space bars 50 extend the entire width of the machine and are arranged with adjustable guides 69 thereon for guiding the chafer strips 70 to their proper position.

The present invention contemplates improved means for stitching the fabric plies and the squeegee stock, and for stitching the chafer and flipper strips applied to the edges of the tire carcass. The stitching mechanism, as shown in Figs. 6 and 10 to 13, inclusive, is carried by a frame 70 which is hinged on a shaft 71 that extends between the upstanding brackets 40.

The frame member 70 carries the stitchers for stitching the squeegee stock and fabric plies 5 and also the side stitchers for stitching the chafer strips, bead flippers and edge positions of the fabric plies.

The first mentioned stitchers comprise, as shown in Figs 10 and 11, a plurality of 10 thin metal disks 72 each being formed with a plurality of peripheral teeth 73. These stitcher disks are mounted for free movement on a rod 74 carried by the side arms 75 of a bracket 76 secured to the free end of the frame member 70. 15 The supporting rod 74 is considerably smaller in diameter than the openings on the disks 72 through which it passes. The disks are also positioned adjacent each other and are arranged to have a slight lateral movement.

The shaft 71 to which the frame member is rigidly secured has its one end provided with a perpendicular arm 77 to which a counterweight 78 is secured. The counterweight 78 is arranged to normally hold the frame number 70 in an upright position, as shown in Fig. 2 and in dotted outline in Fig. 6.

After the fabric ply or strip of squeegee stock is applied to the tire carcass being constructed, the machine operator grasps the handles 79 at the free end of the frame member 70 and moves the same downwardly so that the stitcher disks contact with the partially built tire carcass mounted on the rotating drum 1. The operator exerts downward pressure on the handles 79 so as to produce stitching pressure on the fabric ply or squeegee stock being stitched, which causes the stitcher disks 72 to rotate on the supporting rod 74.

In ply stitching devices used heretofore, the stitcher roll had a tendency to cause the material being stitched to build or bank up in front of the same, which frequently caused a folding over of the material, thereby forming objectionable ridges or creases. This folding over of the material being stitched, in advance of the point of contact of the stitcher roll therewith, was due to considerable extent to a lack of positive pressure and to the fact that the stitcher roll had a continuous unbroken circumferential surface which, during operation, rotated about a fixed axis.

In the ply stitching device of the present invention, the individual narrow disks 72 have full freedom of movement relative to each other and do not move about a fixed axis but move about an eccentrically positioned axis. This action, together with the interrupted circumferential surfaces of the stitcher disks 72, prevents the banking up of the material being stitched in advance of the stitching contact. The regularly spaced teeth 73 on the individual stitcher disks 72 tend to smooth out the irregularities in the material being stitched with the result that the fabric plies or strips of squeegee stock are very evenly stitched to the underlying material without the formation of objectionable folds or creases in the fabric plies or squeegee stock.

The spaced stitchers for the chafer strips, flippers and edges of the fabric plies are also mounted on the frame member 70. These stitchers are in the form of circular plates 80 carried by sleeves 81 mounted on a shaft 82 which is rigidly secured to a bracket 83. The bracket 83 is hingedly mounted on a bar 84 carried by the frame member 70. The plates 80, through the bracket 83, are normally held in inoperative position relative to the frame 70 by means of a latch 85 pivoted to the frame member 70.

When the latch 85 is released the bracket 83 can be pivoted to its operative position, as shown in Fig. 12, and it is held in this position by a stop bar 86 also pivoted to the frame member 70 which is arranged to engage the bracket 83, as shown. The stop bar 86 is pivoted to a link 87 which in turn is connected with a bell crank 88 hinged to the member 76. A spring 89 is connected with the bell crank 88 to normally hold the stop bar 86 in its inoperative position, as shown in Fig. 11. An actuating lever 90 is pivoted to the member 76 adjacent one of the handles 79, where it can be easily grasped by the operator's hand, and this lever is connected to the bell crank 88 through a link 91.

The link 87 is formed with a projecting pin 92 which is in engagement with the latch 85. In order to bring the side stitchers into operative position, the operator swings the frame member 70 forwardly and downwardly and then moves the actuating lever 90 toward the adjacent handle 79, which through the linkage mechanism, releases the latch 85, allowing the bracket 83 to swing downwardly, as shown in Fig. 12.

The stitcher plates 80 are circular in shape and have a plane inner surface 93, and each plate is formed with an annular central portion 94 that telescopes in spaced relation with the sleeve 81, and the sleeve has a flange 95 which has a relatively close sliding fit with the central portion 94. The annular portion 94 is formed at its open end with a removable inwardly extending radial collar 96 that has a rotatable and sliding fit with the sleeve 81, and a compression spring 97 is interposed between this collar 96 and the flange 95 of the sleeve 81. The spring normally holds the plate 80 inwardly in abutting engagement with a stop collar 98 rigidly secured to the sleeve 81.

Each plate 80 is mounted for free rotation on the shaft 82 and is provided with an anti-friction bearing 99 at its outer end which has slidable engagement with the shaft 82, as shown in Fig. 10.

In the operation of the side stitching device just described, the operator pivots the frame member 70 downwardly and releases the latch 85, thus moving the stop bar 86 into abutting engagement with the bracket 83. The operator then exerts downward pressure on the handles 79 to produce stitching pressure against the carcass being assembled on the drum 1. The initial engagement of the stitcher plates 80 with the carcass C on the drum 1, as indicated in Fig. 13, occurs near the edges of the carcass, but in the horizontal portion, as shown by the dotted lines. The operator gradually increases the stitching pressure and this, by reason of the fact that the stitchers 80 are slidably and rotatably mounted on the shaft 82, causes the stitchers 80 to gradually move outwardly, then downwardly along the vertical portions of the carcass, as shown in solid outline, and thence outwardly to the extreme edges of the carcass. The circumferential edge and plane surface 93 of the stitchers 80 thus quickly and efficiently stitch the edges of the carcass to provide the desired contacting relation between the overlapping plies, chafer strips and bead flippers.

The side stitching device just described presents many advantages which are not obtainable in devices known heretofore, since it allows both edges of the carcass to be stitched simultaneously, and since it permits a more positive pressure to be exerted against the carcass being constructed on the drum. The device just described also eliminates the so-called hand stitchers and saves the time of skilled operators, with a resultant saving in labor cost.

The tire building machine of the present invention presents many advantageous characteristics which tend toward an acurately constructed product, a saving in labor cost, and the elimination of hand tools.

In the tire building machine described, the stock employed is conveniently arranged for easy, rapid and extremely efficient application to the carcasses being built, with the result that the finished products will be uniformly constructed.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What we claim is:

1. The combination in a tire building machine of a rotatable tire assembly drum and a side stitching means, said stitching means comprising a pivoted frame member, a bracket pivoted at one end to said frame member, a fixed shaft rigidly secured to said bracket, a pair of spaced side stitcher plates of circular shape rotatably mounted on said shaft, means resiliently holding said plates inwardly of the ends of said shaft whereby when said plates are brought into engagement with the tire material on the drum and stitching pressure exerted thereon, said plates may move outwardly upon an increase in pressure toward the ends of said shaft, latch means for normally holding said fixed shaft adjacent said frame member, and means for releasing said latch to permit said bracket to swing away from said frame member and move said plates to operative position.

2. The combination in a tire building machine of a rotatable tire assembly drum and a side stitching means, said stitching means comprising a pivoted frame member, a bracket pivoted at one end to said frame member, a fixed shaft rigidly secured to said bracket, a pair of spaced side stitcher plates of circular shape rotatably mounted on said shaft, means resiliently holding said plates inwardly of the ends of said shaft whereby when said plates are brought into engagement with the tire material on the drum and stitching pressure exerted thereon, said plates may move outwardly upon an increase in pressure toward the ends of said shaft, latch means for normally holding said fixed shaft adjacent said frame member, means for releasing said latch to permit said bracket to swing away from said frame member and move said plates to operative position, and means operable by said latch releasing means for engaging said bracket and holding said fixed shaft away from said frame member.

3. The combination in a tire building machine of a rotatable tire assembly drum and a stitching means, said stitching means comprising a pivoted frame member, a plurality of relatively narrow fabric ply stitchers carried by said frame member arranged to engage the ply material carried by said drum when said frame member is pivoted toward said drum, a bracket pivoted to said frame member, an axially fixed shaft carried by said bracket, and a pair of spaced side stitchers rotatably mounted on said shaft, latch means for normally holding said bracket and shaft adjacent said frame member when said ply stitchers are in operative position, and means for releasing said bracket and for holding the free end of said bracket in spaced relation to said frame member, whereby said side stitchers may engage and stitch the material carried by said tire assembly drum.

4. The combination in a tire building machine of a rotatable tire assembly drum and a stitching means, said stitching means comprising a pivoted frame member, a plurality of relatively narrow fabric ply stitchers carried by said frame member arranged to engage the ply material carried by said drum when said frame member is pivoted toward said drum, a bracket pivoted to said frame member, an axially fixed shaft carried by said bracket, and a pair of spaced side stitchers rotatably mounted on said shaft, latch means for normally holding said bracket and shaft adjacent said frame member when said ply stitchers are in operative position, means for releasing said bracket and for holding the free end of said bracket in spaced relation to said frame member, whereby said side stitchers may engage and stitch the material carried by said tire assembly drum, a frame, a shaft on said frame to which said frame member is rigidly attached, and a weight eccentrically mounted on said shaft for normally holding said frame member away from the tire assembly drum.

5. The combination in a tire building apparatus of a rotatable drum for carrying tire material and a side stitching means, said means including a swingable frame, an axially immovable shaft secured intermediate its ends to said frame, a pair of spaced rotatable stitching disks, and means for mounting each disk on said shaft for sliding and rotatable movement, said last named means comprising a sleeve secured to the shaft and having a radial outwardly extending flange at its outer end, an annular sleeve portion on the disk telescopically receiving said flange and having a fixed radially inwardly extending collar at its inner end slidably and rotatably engaged with said sleeve, and a coiled compression spring intermediate said flange and collar.

6. The combination in a tire building apparatus of a rotatable drum for carrying tire material, a side stitching means, said means comprising an axially immovable shaft, spaced sleeves axially fixed on said shaft, each having a radial shoulder at its outer end, a disk mounted for free rotating and sliding movement on each end of said shaft, each disk having a sleeve portion telescoping the adjacent sleeve with working clearance and having an abutment extending radially inwardly toward the said sleeve and a coil spring around the said sleeve and between said shoulder and abutment whereby to resiliently hold the disk inwardly of the end of said shaft, and means for moving said shaft toward said drum to engage said disks with the material carried on said drum.

WALTER JAMES BRETH.
MAX LEO ENGLER.